United States Patent
Aitto-Oja

(10) Patent No.: US 11,873,175 B2
(45) Date of Patent: Jan. 16, 2024

(54) HAULING BEAM, HAULING TRANSPORTER AND METHOD FOR LOADING

(71) Applicant: Simec Systems Oy, Oitti (FI)

(72) Inventor: Simo Aitto-Oja, Hankasalmi (FI)

(73) Assignee: Simec Systems Oy, Oitti (FI)

( * ) Notice: Subject to any disclaimer, the term of this patent is extended or adjusted under 35 U.S.C. 154(b) by 299 days.

(21) Appl. No.: 17/345,065

(22) Filed: Jun. 11, 2021

(65) Prior Publication Data
US 2022/0396440 A1    Dec. 15, 2022

(51) Int. Cl.
*B65G 67/20*     (2006.01)

(52) U.S. Cl.
CPC ..................... *B65G 67/20* (2013.01)

(58) Field of Classification Search
CPC ........ B65G 67/20; B65G 13/12; B65G 39/12; B65G 65/02; B65G 7/04; B65G 7/08; Y10T 403/55; Y10T 403/551; F16B 7/10
USPC .............. 403/183, 109.1; 414/373–402
See application file for complete search history.

(56) References Cited

U.S. PATENT DOCUMENTS 10,124,927 B2 * 11/2018 Bradley ................. G06F 11/302
10,618,753 B2 * 4/2020 Hopkins ................. B65G 67/02

FOREIGN PATENT DOCUMENTS

FI          127072 B    10/2017
KR     101183183 B1    9/2012

* cited by examiner

*Primary Examiner* — Lynn E Schwenning
(74) *Attorney, Agent, or Firm* — Laine IP Oy

(57) ABSTRACT

According to an example aspect of the present invention, there is provided a hauling beam comprising at least two hauling beam modules, the modules comprising two nested beams, an outer beam and an inner beam, said nested beams configured to be movable longitudinally with respect to each other, wherein an inner beam of the first hauling beam module is connected to an inner beam of the second hauling beam module by a connector configured to transfer both forwards and backwards longitudinal movement of said inner beam of said first hauling module to the inner beam of said second hauling module.

14 Claims, 8 Drawing Sheets

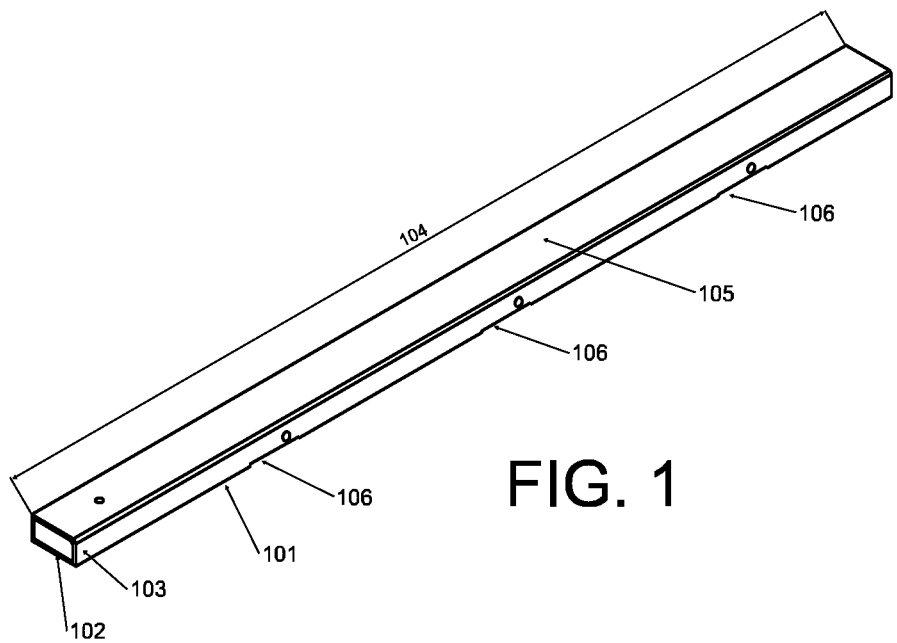
FIG. 1
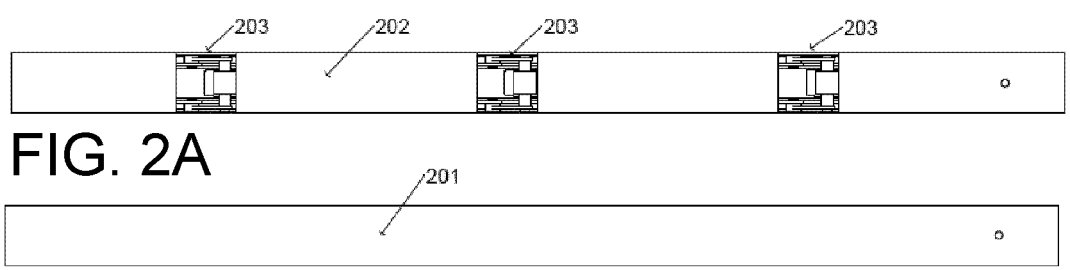
FIG. 2A
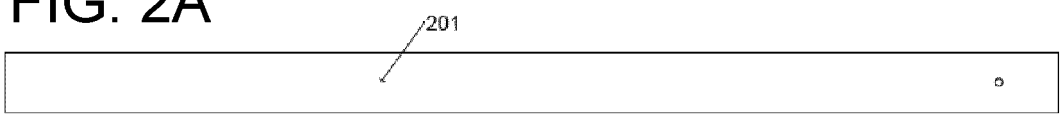
FIG. 2B
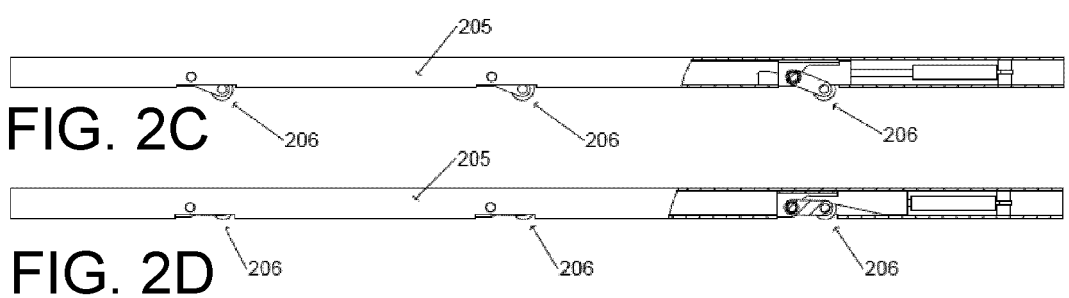
FIG. 2C
FIG. 2D

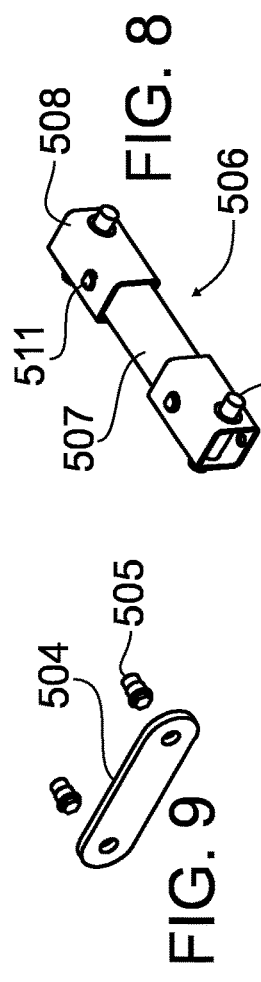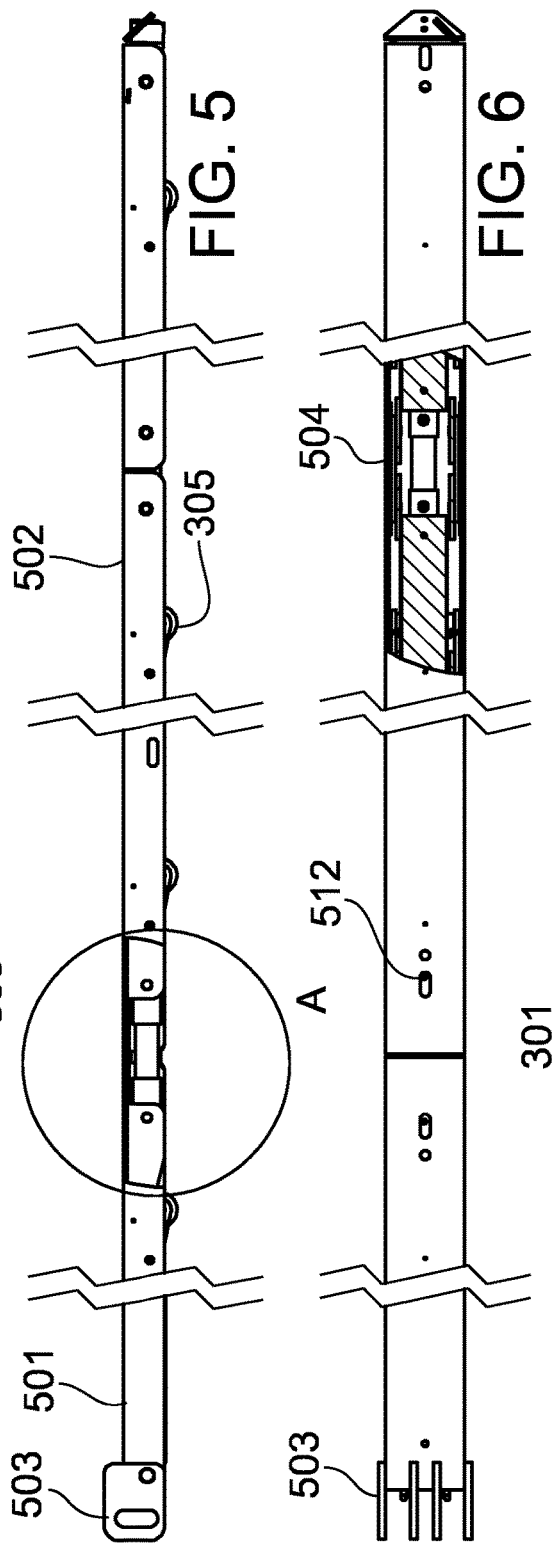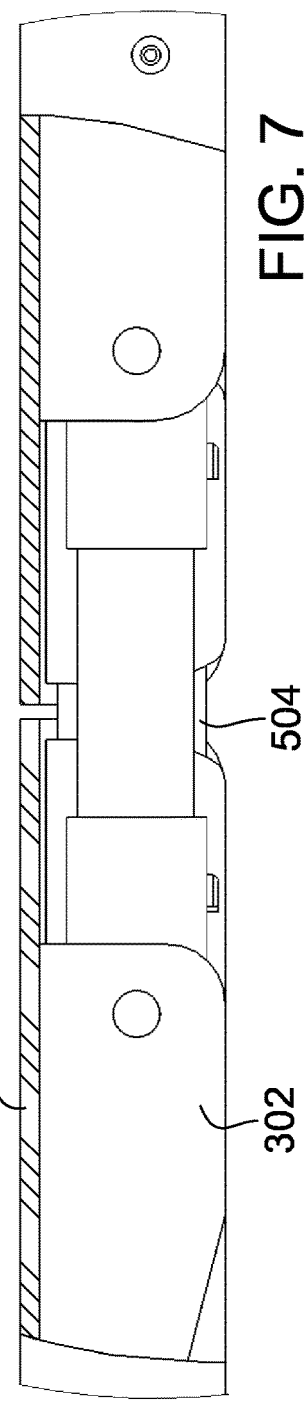

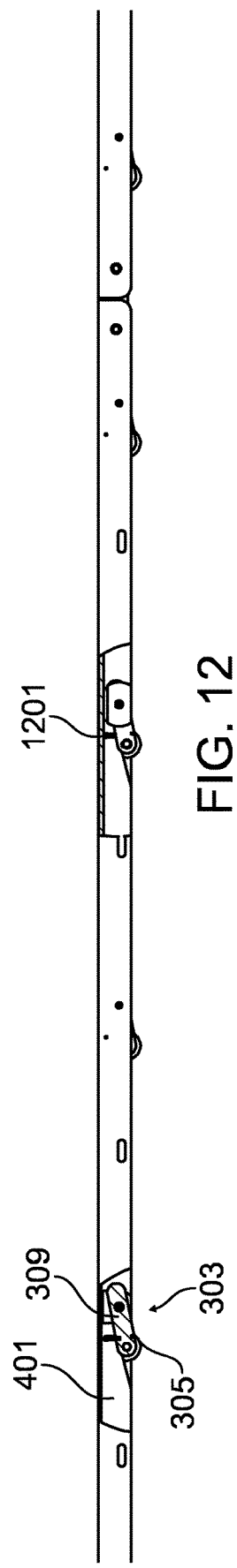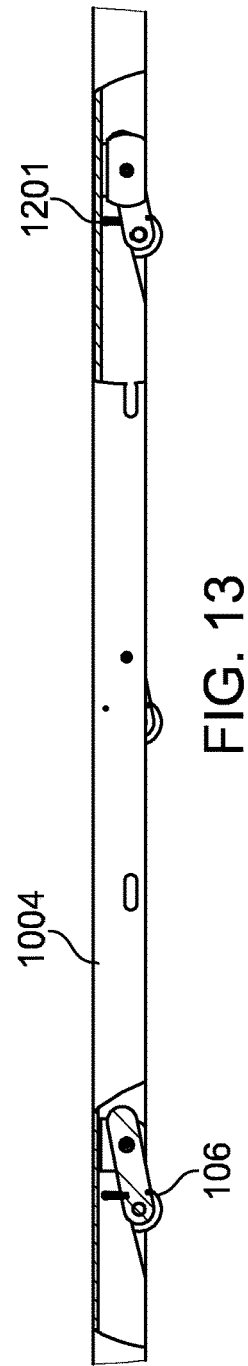

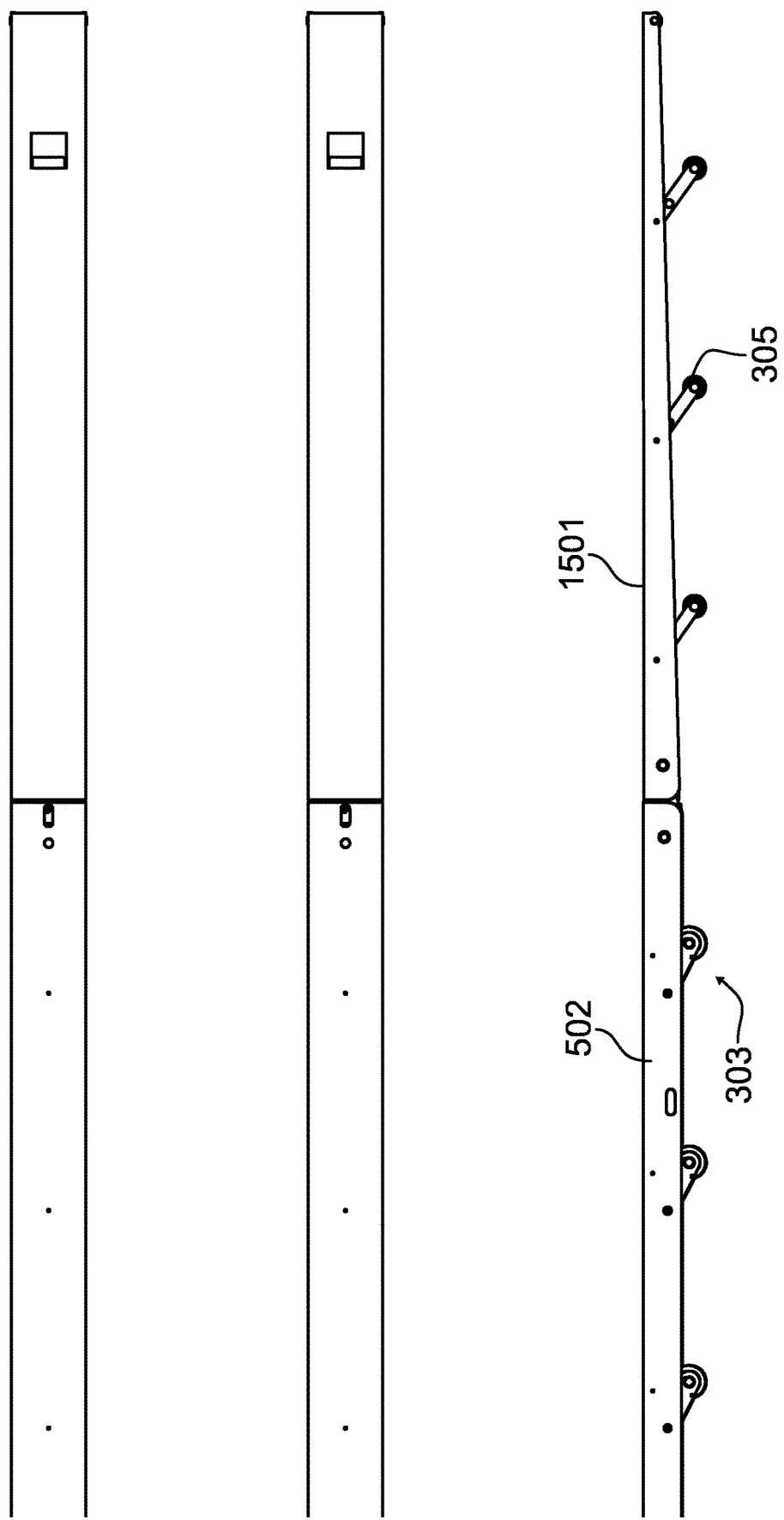

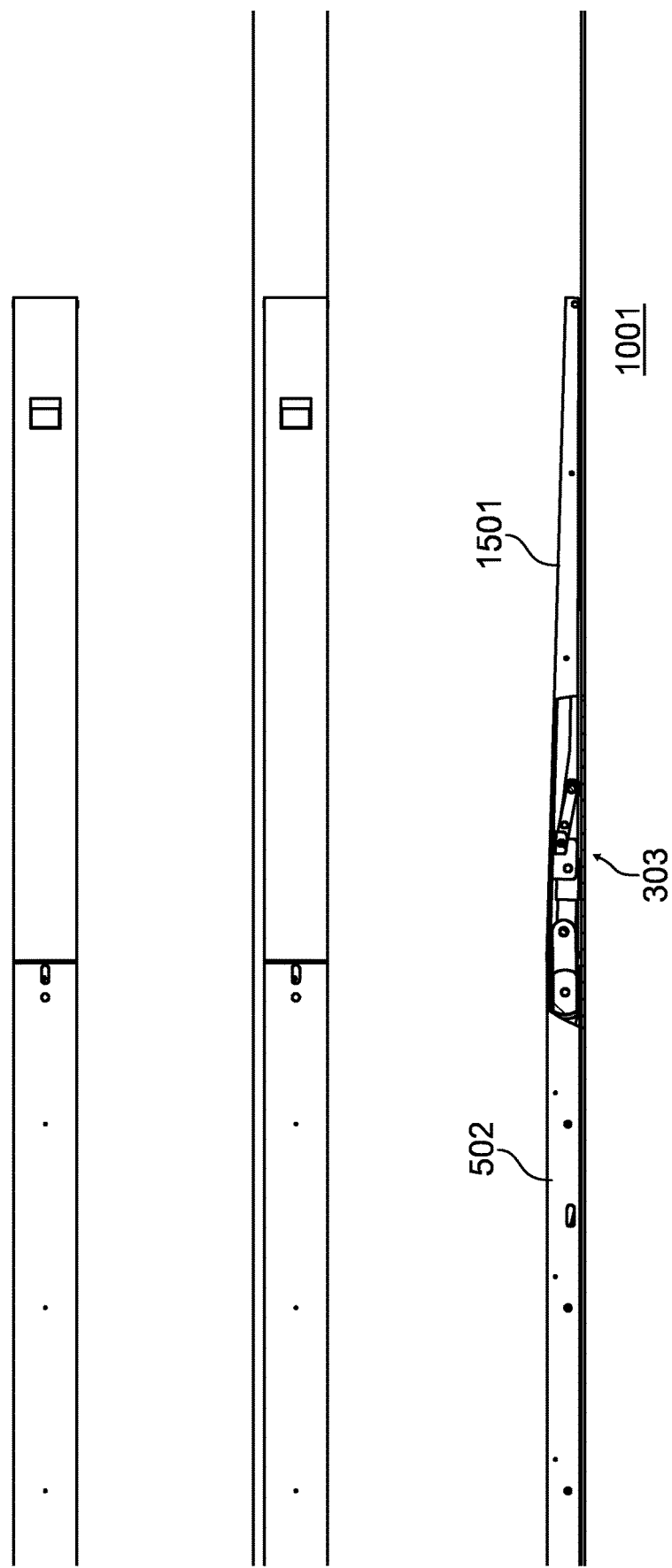

US 11,873,175 B2

HAULING BEAM, HAULING TRANSPORTER AND METHOD FOR LOADING

FIELD

The invention concerns a hauling beam lifting mechanism suitable for moving heavy loads such as containerization. In addition, the invention relates to a transporter comprising such a hauling beam and a method for transferring a load on loading.

BACKGROUND

The transfer of heavy loads requires durable and reliable equipment. Various loading methods and mechanisms have been developed for the transfer of heavy loads. Typically, the loads are assembled on a transfer system and run along a loading line specifically made for them. The loading equipment used are large and at least partly solid structures. In addition to transfer lines, means are needed to transfer the load from the line to a means of transport carrying the load, such as a container, trailer or train. The truck can be loaded and unloaded with a forklift. This is slow. In addition, in order to prevent damage to the truck, a pallet is often used in each truck-mounted load unit. Forklift pallets take up space in the transport trolley.

Publications KR-10-1183183 and FI 127072 disclose hauling beams and methods for transferring heavy loads.

SUMMARY OF THE INVENTION

The invention is defined by the features of the independent claims. Some specific embodiments are defined in the dependent claims.

According to a first aspect of the present invention, there is provided a hauling beam comprising at least two hauling beam modules, the modules comprising two nested beams, an outer beam and an inner beam, configured to be movable longitudinally with respect to each other, a support arm is movably attached to the outer beam, a slip ring and a roller coaxially attached to the support arm, the inner beam having a section extending at an angle to the length of the side edge of the inner beam so that the slip ring is arranged so that when the nested beams move relative to each other in the longitudinal direction of the beams, the roller is arranged to move in the vertical direction of the beams. A first hauling beam module comprises an actuator for moving the inner beam in relation to the outer beam, said inner beam of the first beam module is connected to an inner beam of the second hauling beam module by a connector configured to transfer both forwards and backwards longitudinal movement of said inner beam of said first hauling module to the inner beam of said second hauling module and to allow tilting of the connector in relation to the longitudinal direction of said inner beams, and said outer beam of the first beam module is connected to an outer beam of the second hauling beam module by a coupler configured to transfer both forwards and backwards longitudinal movement of said outer beam of said first hauling module to the outer beam of said second hauling module and to allow tilting of the coupler in relation to the longitudinal direction of said outer beams.

According to a second aspect of the present invention, there is provided hauling beam transporter, comprising at least two hauling beams comprising at least two hauling beam modules, the modules comprising two nested beams, an outer beam and an inner beam, configured to be movable longitudinally with respect to each other, a support arm (309) movably attached to the outer beam (301), a slip ring (312) and a roller coaxially attached to the support arm (309, 305), the inner beam (302) having a section (304) extending at an angle to the length of the side edge of the inner beam so that the slip ring (312) is arranged so that when the nested beams move relative to each other in the longitudinal direction of the beams, the roller (305) is arranged to move in the vertical direction of the beams. A first hauling beam module comprises an actuator for moving the inner beam in relation to the outer beam and said inner beam of the first beam module is connected to an inner beam of the second hauling beam module by a connector configured to transfer both forwards and backwards longitudinal movement of said inner beam of said first hauling module to the inner beam of said second hauling module and to allow tilting of the connector in relation to the longitudinal direction of said inner beams. Said outer beam of the first beam module is connected to an outer beam of the second hauling beam module by a coupler configured to transfer both forwards and backwards longitudinal movement of said outer beam of said first hauling module to the outer beam of said second hauling module and to allow tilting of the coupler in relation to the longitudinal direction of said outer beams. and the hauling beams are mounted on a move platform.

According to a third aspect of the invention, there is provided A method for transferring a load, comprising: collecting a load and placing it on a hauling transporter, lifting the move platform of the hauling transported on rollers by operating a lift system, pushing the hauling transporter to a loading location, lowering the move platform on a surface, lifting the load from the move platform by the hauling beams, and pushing the load on the hauling beams to the loading location.

BRIEF DESCRIPTION OF THE DRAWINGS

FIGS. 1-4 illustrate a hauling beam described in FI 127072.

FIG. 5 shows a hauling beam in accordance with at least some embodiments of the present invention in a side view;

FIG. 6 shows a hauling beam of FIG. 5 in a top view;

FIG. 7 shows a detail A of the FIG. 5;

FIGS. 8 and 9 show parts of the hauling beam of FIGS. 5 to 7 in detail;

FIGS. 12 and 13 depict a feature of an apparatus depicted in FIGS. 10 and 11;

FIG. 15 shows an example apparatus capable of supporting at least some embodiments of the present invention, and FIG. 16 shows the apparatus of FIG. 12 in another operating position.

EMBODIMENTS

Figure 3:
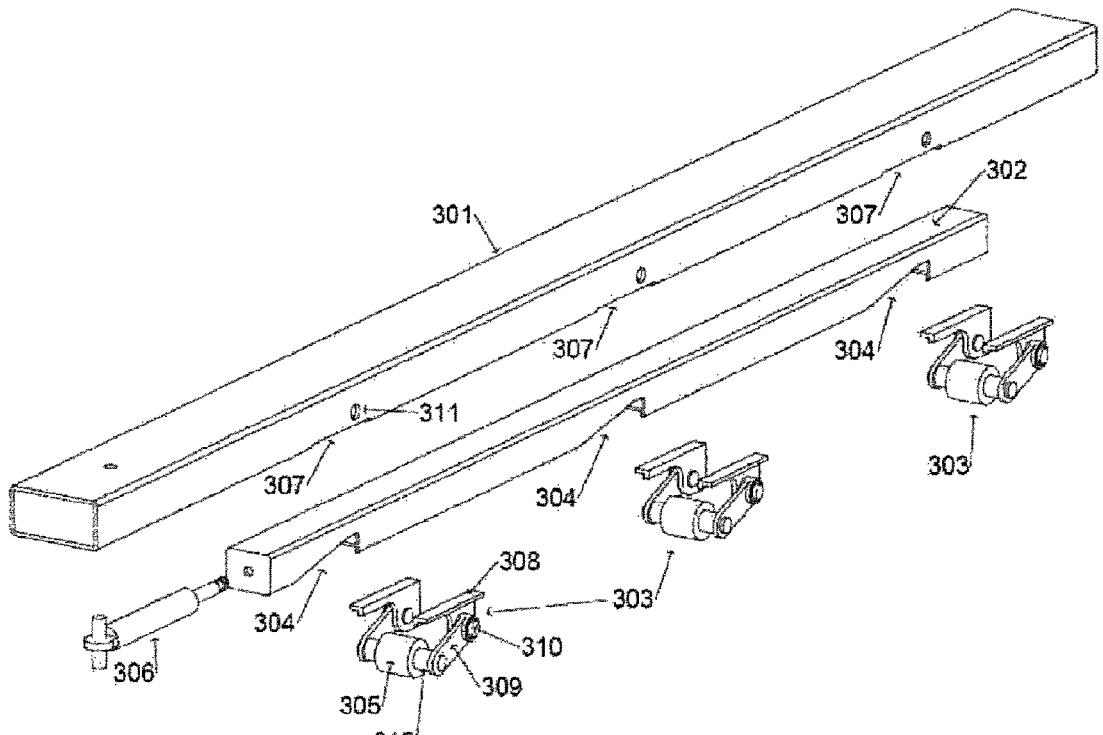

A hauling beam is referred to herein as a beam used to move goods, cargo, loads or the like, typically large and/or heavy entities. The hauling beam can be placed in connection with, typically underneath or below, a load to be moved, so that by moving the hauling beam the load can be moved. The hauling beam can be moved, for example, by dragging. Hauling refers to grabbing, dragging, dragging, retouching, cumbersome carrying, or pulling. The hauling beam described herein makes it possible to lift the load to be transferred on the rollers, wheels or rolls and to transfer the load by means of them.

The hauling beam described herein relates to hauling beams of the type disclosed in FI 127072. Such hauling beams can be lifted on rollers and a load can be transferred on top of a system of hauling beams. However, the hauling beam of FI 127072 is a single beam. When long loads or equipment are handled, the dimensions of the hauling beam become long, or large. This causes high stresses on the structure if the surface on which the loading is performed is even slightly uneven. Also, the length of the hauling beam can't be changed after it is assembled and transporting long items is tedious and expensive. A modular structure wherein the hauling beam is constructed of hauling beam modules connected to each other by joints allowing the relative movement of the hauling beam modules in height direction (in direction crosswise to the longitudinal direction of the hauling beam or the top of an outer beam of the hauling beam module) allows the hauling beam to accommodate to the profile of the surface on which it is operated.

In order to more fully understand the invention, a hauling beam disclosed in FI 127 072 is described below. The original description is referred to for more detailed disclosure of the hauling beam described therein.

FIG. 1 illustrates a hauling beam with a lifting mechanism. Inside an outer beam 101 shown in FIG. 1, there is a second beam, an inner beam. Nested beams are typically of different lengths. Nested beams can be of different sizes and/or different shapes. The beams are elongate, so that the dimensions, width 102 and height 103 of their side profile are small compared to the length 104 of the beam. The beams are made of steel or similar durable material. The hauling beam 101 has a rectangular side profile. The opposite sides of the outer beam are similar, having the same shape and the same size. The hauling beam may, for example, have a square side profile. In this case, the width 102 and the height 103 of the hauling beam 101 are equal. The hauling beam has an upper surface 105 against which the load can be placed. The inner surface of the outer beam is against the outer surface of the inner beam. Thus, the upper surface 105 of the outer beam facing the load is supported with the upper surface of the inner beam. On the opposite surface of the upper surface 105 of the beam, the lower surface of the beam, there are rollers 106 which can be raised to or above the level of the lower surface of the hauling beam and lowered below the lower edge of the hauling beam. The rollers 106 raise the beam. The load placed on the top surface 105 of the hauling beam can be lifted by moving the rollers 106, whereafter the load may be transferred. As the rollers 106 rise, the load placed on the hauling beam 101 rises on the rollers 106 and is displaceable by the hauling beam 101 and its lifting mechanism.

FIG. 2A shows a bottom view of a hauling beam and FIG. 2B shows a top view of a hauling beam. The upper surface 201 of the hauling beam shown in FIG. 2B forms a straight railing-shaped area on which the load or other entity to be moved can be placed. Depending on the load, several beams can also be used at the same time. The upper surface 201 of the hauling beam is typically much larger in the longitudinal direction than in the width direction. The dimensions of the straight railing that forms the top surface of the hauling beam may vary depending on the application and type of load. Also, the thickness of the rectangular material, downward from the shown surface, may vary as appropriate. FIG. 2A shows a bottom view of the hauling beam. The lower surface 202 of the hauling beam shown in FIG. 2A is parallel to and opposite to the upper surface 201 of the hauling beam shown in FIG. 2B. The hauling beam is typically symmetrical, i.e., the portion forming its upper surface 201 and the portion forming the lower surface 202 are of the same size and shape. The portion forming the upper surface 201 of the hauling beam and the portion forming the lower surface 202 are connected to each other by rectangular side portions illustrated in FIGS. 2C-D. Openings 203 for lifting mechanisms are cut in the rectangle forming the lower surface 202 of the hauling beam.

FIG. 2C shows a side view of a hauling beam and a lifting mechanism when the rollers 206 of the lifting mechanism are set in the down position. FIG. 2C shows the hauling beam on the side 205, i.e. the side part of the hauling beam. A corresponding side portion connects the top and bottom of FIGS. 2A-B to each other on both of their longitudinal sides. In FIG. 2C, the rollers 206 of the lifting mechanism are lowered below the lower surface 202 of the hauling beam. In this case, the outer surface of the rollers 206 is the lowest part of the hauling beam, against a base on which the hauling beam operates. The hauling beam, and the load placed on it (on the upper surface 201), can be moved on the rollers 206. The rollers 206 facilitate the transfer of the load placed on top of the hauling beam.

FIG. 2D shows a side view of a hauling beam and a lifting mechanism when the rollers are in the upper position. When the hauling beam of FIG. 2C can be used to move the load on the hauling beam (on the top surface 201), in the hauling beam of FIG. 2D, the rollers 206 are inside the beam. In the position of FIG. 2D, the outer circumference of the rollers 206 is above or at most just below the lower surface 202 of the beam. In the position of FIG. 2D, the hauling beam is not movable, but remains firmly in place. The lower surface 202 of the beam is against the base on which it operates. The position of FIG. 2D can be used, for example, during transport or load preparation. When preparing a load, the load-bearing unit is collected, loaded, placed, tied or arranged on top of the hauling beam.

FIG. 3 shows parts of a hauling beam. The hauling beam has two nested beams, an outer beam 301, i.e. a frame beam, and an inner beam 302 arranged inside it. In FIG. 3, the beams 301, 302 are tubular, hollow structures. The structure of the beam may also be angular U-shaped, with the beam comprising an upper surface and the sides being open downwards. The side forming the lower edge of the hauling beam against the base may be open or include openings for lowering the rollers of the lifting mechanism below the lower surface of the hauling beam, as its bearing part. The hauling beam may consist of a hollow, four-walled beam and an angular U-shaped beam, or two similar nested beams. The inner beam 302 has sloping cuts 304 at the side edges. The intersections of the inner beam advance at an angle to the longitudinal direction of the beam. The cuts 304 on the sides of the inner beam allow the rollers 305 to move. The inner beam is moved by hydraulics, by using a hydraulic cylinder 306. Hydraulic unit may be inside the hauling bar. The hydraulic cylinder 306 is attached to the inner beam 302, one end of the inner beam.

FIG. 3 shows parts of the lifting mechanism 303. The lifting mechanism has a support plate 308 which is fixedly attached to the outer beam 301, i.e. the frame beam. Support arm 309 is movably articulated to the support plate 308. The mounting shaft of the support arm 309 and the support plate 308 sets in the openings 311 on the sides of the outer frame beam. Support arms 309 may be positioned on opposite sides of the frame beam independently, or may be positioned on an axis passing between opposite sides of the frame beam. The support arm 309 is pivotable and can be implemented, for example, by means of a plain bearing. A shaft with a slip ring 312 and a roller 305 is movably attached to one end of the support arm 309, or the slip ring 312 or slider is attached to the support arm and forms a shaft portion passing through the roller 305. The circumference of the roller is larger than that of the slip ring 312. The roller 305 and the slip ring 312 are coaxial.

The outer beam 301 forms a support frame for the hauling beam. In FIG. 3, the underside of the outer beam 301 has openings 307 to allow the rollers 305 of the lifting mechanism to move. Opposite the lower edge of the outer beam 301, the upper edge is arranged to receive the load. The outer beam according to the second embodiment consists of an upper load receiving part and side parts, the lower part of the beam being open. Parts of the lifting mechanism 303 are fixedly welded inside the outer beam 301. The lifting mechanism may be without a support plate 308, whereby it can be movably attached to the outer beam 301. The support plate 308 is fixed to the inner upper surface of the outer beam. According to at least some embodiments, the support plates 308 are secured against the inner top surface of the outer beam and the side edges adjacent to the top surface. The distance between the outer edges of the attached lifting mechanism support plates 308 corresponds to the inner width of the outer beam 301. An inner beam 302 is placed between the support plate parts 308 of the lifting mechanism 303 fixedly mounted inside the outer beam 301, above the roller parts 305. The inner beam 302 is movable and can be moved by means of hydraulics 306. The inner beam 302 is arranged to move inside the outer beam 301, in the longitudinal direction of the beams. The inner beam 302 is at least reciprocally shorter than the outer frame beam 301 in the longitudinal movement of the beams. As the inner beam 302 moves, a sliding ring 312 against its side edge cut 304 moves the rollers 305 up and down, respectively, in the vertical direction of the beams. The movement of the rollers takes place in relation to the plane of the lower edge of the hauling beam or the outer beam 301. The outer circumference of the roller may be located vertically above or below the lower edge of the beam.

The hauling beams according to the embodiments have rollers, wheels or rolls. The roller is arranged to move between its extreme positions. One of the extreme positions is one in which the roller is completely inside the beam (FIG. 2D) and the other is one in which the roller 204 is below the lower surface of the beam (FIG. 2C), whereby the roller protrudes from the plane of the lower edge of the beam. The roller can also be used in the intermediate position between its extreme positions, for example just slightly below the bottom of the bar. The outer beam may have an opening for a roll. Alternatively, the outer beam may consist of only the top edge and two side edges, with the bottom side being completely missing and open. In some applications, four sides can provide the desired rigidity to the structure. With a U-shaped beam structure, material costs can be saved and a lighter structure can be achieved. The opening 203, 307 of the outer beam is typically only on the underside of the beam. The inner beam has a corresponding opening arrangement. The opening of the inner beam is also at its bottom. The openings in the nested beams are at corresponding points to lower the rollers below the bottom of the hauling beam.

Either or both of the bars may be open on their entire sides. In this case, the alignment of the openings does not need to be designed or implemented. According to the shapes, the side edges of the inner beam 302 have triangular sections 304 at the openings in the underside. The slip rings 312 abut the diagonally cut side edge of the inner beam 302. The movement of the inner beam 302 causes the sliding ring to move against the oblique section 304 of the side edge, and thus the roller 305 to be positioned at a height corresponding to the oblique section 304 with respect to the lower surface of the hauling beam.

The slip ring abuts the side edge of the oblique cut of the inner beam on one side only. The other edge of the inner beam may be uniform, i.e., no cuts. The other side of the lifting mechanism is fixed so that the support arm and any slip ring remain inside the inner beam. Such an arrangement can simplify the structure and bring advantages, for example in a narrow structure. The roller part may be relatively wider when the slip ring is only at one end of the shaft.

The lifting mechanism roller 305 is movably attached to the support arm 309. The support arm 309 may be attached to an outer beam 301 or a support plate 308 fixedly attached to the outer beam 301. The support arm 309 may be on a shaft fixed to the outer beam 301 or a shaft with one end attached to the outside 301 and the other end in the support plate 308. The support plate 308 is fixed to the outer beam 301. The central axis of the roller, coaxial with the roller 305, has a slip ring 312. The slip ring 312 is arranged to slide against the side beam 302 of the inner beam 302. The straight lower edge of the vertical wall of the inner beam 302 may be slid against the ring 312, in contact therewith. The hauling beam raises the load on it on the rollers when the inner beam is moved in the length direction of the beam, whereby the slip ring moves against the side edge of the inner beam, respectively, and the roller moves with the sliding ring in the vertical direction of the beam.

Figure 4:
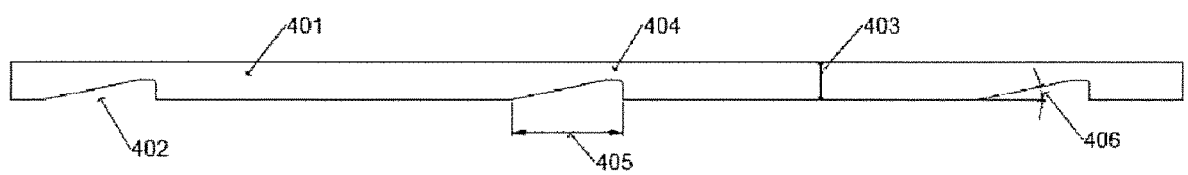
Figure 10:
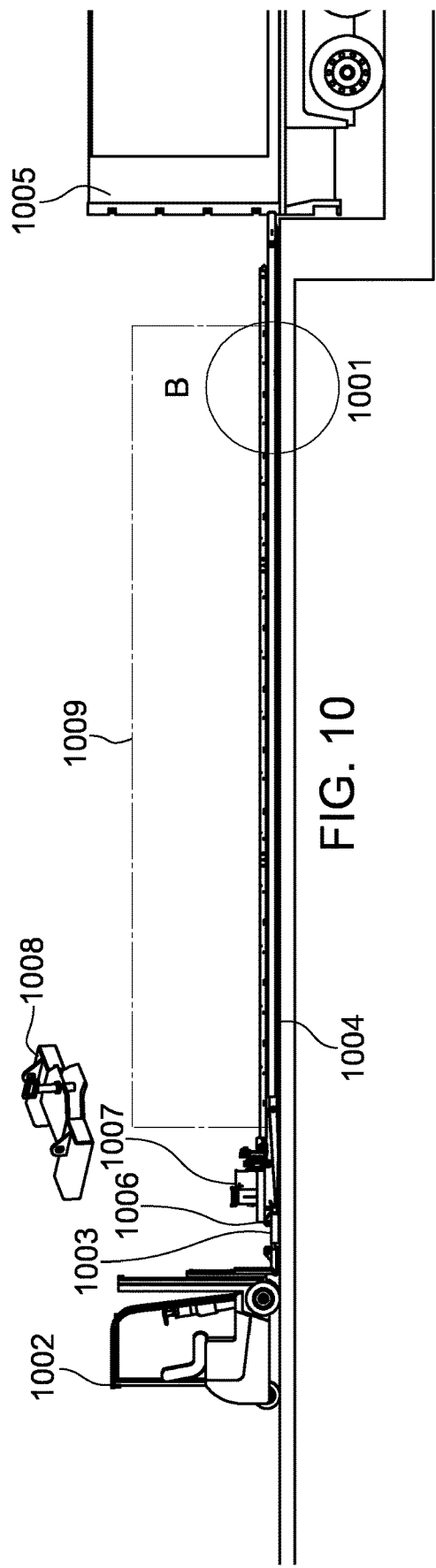
FIG. 10 illustrates an example apparatus capable of supporting at least some embodiments of the present invention.
Figure 11:
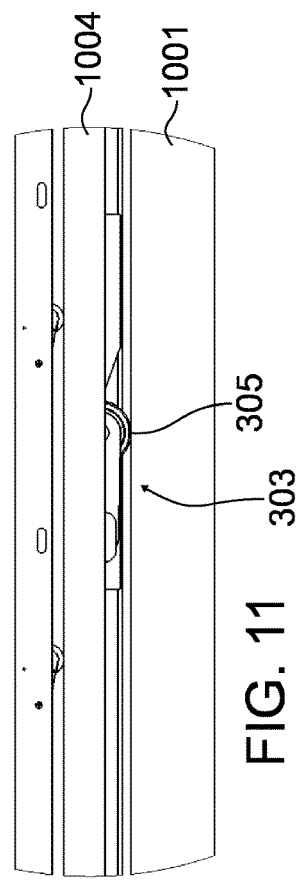
FIG. 11 shows the detail B of the FIG. 10.
Figure 14:
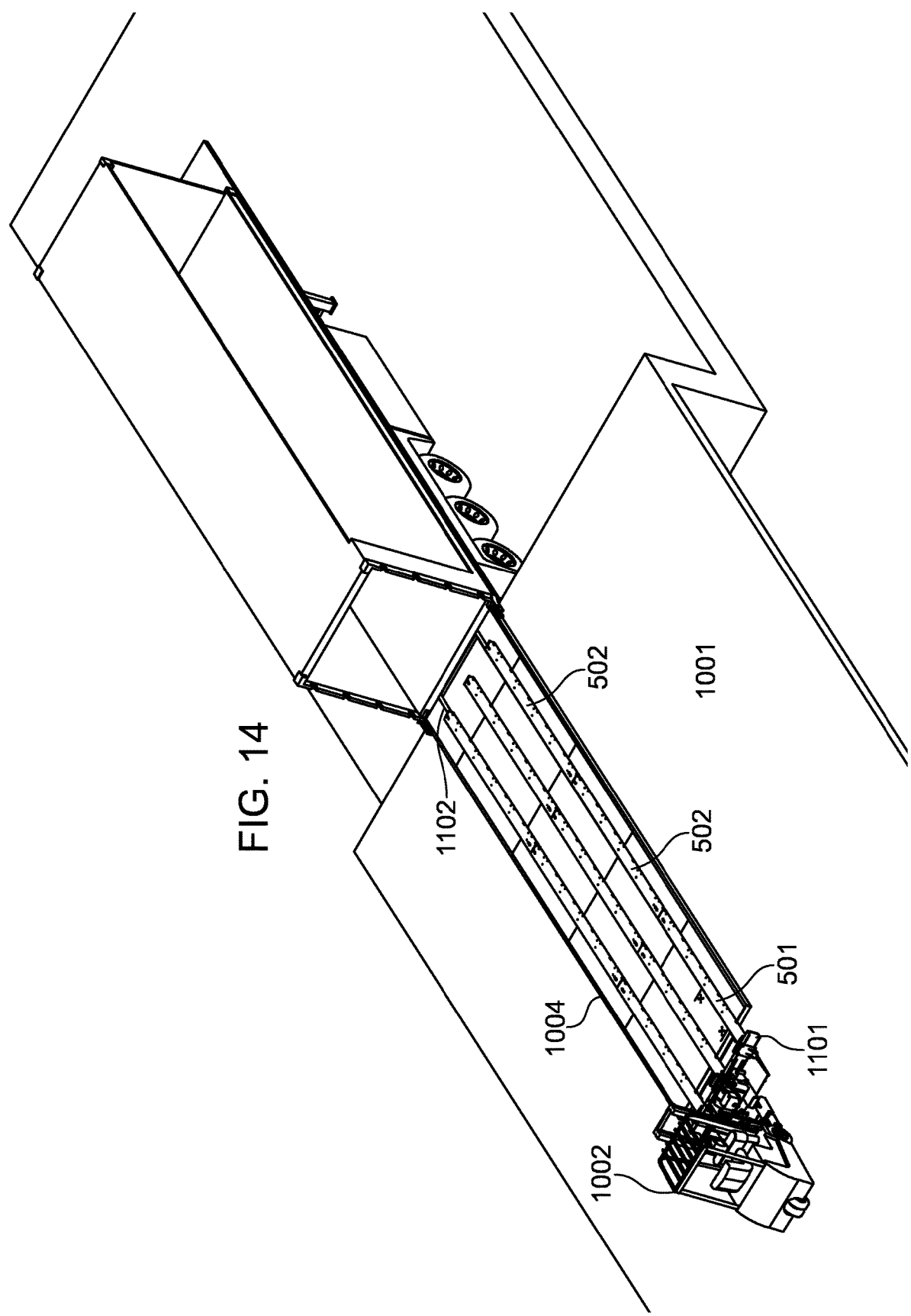
FIG. 14 shows the apparatus of FIG. 10 in a top view.

FIG. 4 shows the inner beam of a hauling beam. The beam in FIG. 4 has the shape of a downwardly opening angular U. Triangular openings 402 are cut in the side walls 401 of the inner beam. Both side walls of the inner beam have openings of the same size at the same points, symmetrically. Alternatively, the openings may be located only on the second side wall of the inner beam. The height 403 of the side wall of the inner beam may be 60-400 mm, or preferably 80-200 mm, for example 100 mm. The length of the opening 405 cut from the side wall, in the longitudinal direction of the beam, may be 50 to 400 mm, 100 to 300 mm, for example 250 mm. The cutting angle 406 of the opening cut in the side wall may be 4-25°, preferably 6-20°, more preferably 8-15°, for example 12°. The lifting force of the hauling beam can be changed by changing the cutting angle 406 of the opening in the side wall of the inner beam. The gentler cutting angle 406 provides a longer distance to the wheel and a higher lifting force for the load on the beam. The lifting force can also be increased by using a more efficient cylinder to move the inner beam relative to the outer beam and/or to provide a lifting/lowering movement. The highest point of the opening (403-404), or the lowest point of the sidewall at the opening 404, is dimensioned so that the rollers can rise to a position where their circumference is above the level of the lower surface of the hauling beam, against the platform. The thinnest point 404 on the sidewall, which corresponds to the highest point of the oblique section in the longitudinal direction of the beam, is equal to or greater than the radius of the roller. By moving the inner beam, it is possible to adjust the position of the roll and thus the height of the roll relative to the hauling beam. The inner beam moves in the longitudinal direction of the beam and the roller moves in the vertical direction of the beam. The roller can be set to its extreme positions or to any position between its extreme positions. In its lower position, where the roller is the lowest part of the hauling beam and against the base, the roller (s) may be against the straight lower edge of the side wall of the inner beam. That is, the rollers can pass over the sloping portion of the side wall, to the straight lower portion.

The beam rises on the rollers as the side wall cuts of the movable inner beam press down on the slider or ring, and with it the roller. The slide ring is placed on the roller shaft so they move together. Against the inner top side of the outer beam is the outer top side of the inner beam. In this way, the lifting pressure is applied evenly over a wide area to the top beam. The inner beam can be moved by means of a cylinder. The cylinder may be mounted entirely inside the outer frame beam. The cylinder may also be located outside the body beam and/or the piston rod may be inside the body beam attached to the inner beam. The cylinder is usually located at one (either) longitudinal end of the beam. The cylinder can be single or double acting. The hauling beam can be operated by external hydraulics, for example by means of a wheel loader or similar auxiliary hydraulics or by a hand pump integrated in the beam. Two or three beams can be implemented to move (rise/fall) simultaneously at the same speed by means of one pump using, for example, a flow distribution valve. According to one embodiment, in a single hauling beam The inner beam consists of two beams that can be moved independently relative to the outer beam along the length of the beams. This allows the different parts of the beam, for example the heads, to be raised and lowered to the desired height independently and at different times. The hauling bar can have several individually controlled inner beams.

The lifting height of the beam according to the embodiments can be, for example, 10-100 mm. The lifting height can be determined according to the requirements of the application. The lifting force of the lifting mechanism of the beam according to the embodiments can be 8-100 tons. The lifting force can also be implemented according to the application. According to one embodiment, the beam lifting mechanism is operated by a hydraulic cylinder. In the lifting mechanism according to the embodiments, the force of the hydraulic cylinder can be multiplied by a factor of 2 to 10.

FIGS. 7-9 illustrates an example apparatus capable of supporting at least some embodiments of the present invention.

The hauling beam is constructed of hauling beam modules. The first hauling beam module 501 is basically similar to the hauling beam described above comprising an outer beam 301, inner beam 302 and lifting mechanism 303 with a roller 305. The first hauling beam module 501 differs from the other (second 502) hauling beam modules in that the first hauling beam module 501 comprises an actuator 306 for moving the inner beam 302. This actuator 302 may be a hydraulic cylinder as described above. However, any actuator providing reciprocating linear movement is applicable, for example a linear screw, pneumatic cylinder, chain and sprocket system or a toothed rail. The first hauling beam module has connecting brackets 503 at one end and a second hauling beam module is attached to the opposite end. The second hauling beam module simply comprises an outer beam 301, an inner beam and a lifting mechanism 303. The number of second modules may vary and the length of the hauling beam is adjusted by varying the number of second hauling beams used.

As the inner beam 302 must move within the outer beam 301 in each hauling beam module in order to operate the lifting mechanism 303, the modules are connected to each other with a specific mechanism. The outer beams of successive modules are connected by coupling plates 504 arranged on both side edges of the outer beams 301. The coupling plates 504 are flat steel and have connecting holes for plate fastening bolts 505 (FIG. 9). The coupler used for connecting outer beams 301 must be rigid in the longitudinal direction of the hauling beam and/or outer beams in order to be able to provide transfer of force between the outer beams in both directions, i.e. when successive outer beams are pushed towards each other and drawn away from each other. This allows pushing the hauling beam during operation and drawing it backwards. In order to allow the hauling beam to accommodate to varying profile of running surface, for example when pushed into a vehicle from a loading dock or on a floor inside the vehicle or a container, the hauling modules are allowed to move in height direction in relation to each other. For this purpose, the coupling plates 504 have holes at both ends and the coupling plate 504 are connected pivotably to the outer beams by plate fastening bolts 505. The coupling plate may now tilt in relation to the longitudinal direction of the connected outer beams 301. This allows tilting of the connected outer beams in relation to each other as well as vertical displacement because of joints at both ends of the coupling plate 504. The coupling plate 504 may alternatively be a rod, a shaft or a profiled beam, for example. Any rigid construction element capable of transferring the required forces is applicable.

The inner beams 302 of successive first and second hauling beam module are connected by a connector 506, shown in FIG. 8. The connector 506 comprises a connecting piece 507 and two locking brackets 508. The connecting brackets 508 are made of a rectangular tube and comprise vertical holes for locking pins 511 and horizontal holes for pivot axles 509. The connecting piece 507 may be a rectangular tube or bar dimensioned to fit inside the locking brackets 508. The locking brackets 508 are dimensioned to fit around inner beams 302. The locking brackets 508 may be formed of plates, forged or cast parts or by any other ways of manufacture, but a tubular element is easy and cheap to manufacture. The inner beams 302 have holes for pivot axles 509 and the upper surface (the loading surface) of the outer beam has assembly holes 511. Now, when successive beam modules, either first and second beam module or two successive second beam modules are assembled, the connecting pieces 508 may be set on the ends of the inner beams 302. The connecting piece 507 may now be pushed inside one of the locking brackets 508. Then inner beams 302 can be pushed on the connector 506. The connector 506 is locked to both of the inner beams by setting locking pins 511 through holes in locking brackets and connecting piece through the assembly holes 512 provided on the outer beams 301. Now, the connector forms a solid joint between the inner beams 302 that transfers both pushing and drawing force between the beams and allows tilting and vertical displacement of successive inner beams correspondingly to the outer beams 301. This allows movement of hauling beam modules needed to accommodate the complete long hauling beam to alternating surface. It can be contemplated that the connecting piece comprises only a connector with joints allowing tilting of the connector in relation to the inner beams at each end. However, assembly of the hauling beam would be more complicated by using a connector having a solid construction with set length.

FIGS. 10 to 14 illustrate a hauling transporter comprising modular hauling beams described above. The hauling transporter has three parallel hauling beams, each comprising a first hauling beam module 501 and two successive second hauling beam modules 502. The hauling beams are arranged on a move platform 1004. The apparatus is depicted on a loading dock 1001 for loading vehicles 1005. The move platform 1004 may be a solid platform resting on a surface, herein the loading dock 1001. However, it may comprise a similar lifting mechanism 303 as the hauling beams in order to allow transfer of the whole hauling transporter by a forklift or a similar device. The move platform may be constructed of joined successive modules. One other function of the lifting mechanism is to increase the range of height adjustment of the hauling transporter by using the lifting mechanism 303 for adjusting the height of the apparatus.

The move platform 1004 has a ramp 1005 at one end. At the same end the hauling beams are connected parallel to each other by a connecting beam 1101. The purpose of the connecting beam 1101 is to synchronize the longitudinal movement of the parallel hauling beams. The connecting beam 1101 has also sockets 1006 for forks of a forklift 1002. The connecting beam 1101 may include a hydraulic unit 1007 or other unit for providing power to the actuators of the apparatus, or an outer connection, such as hydraulic power outlet of the forklift may be used. The ramp 1005 has a loop for forklift adapter 1008.

The hauling transporter can be operated as follows: loading of the transported items, herein the load 1009, depicted by hatched lines, can be collected and placed on the hauling transporter on a warehouse or other facility outside the loading platform. When the load is ready, the move platform 1004 is lifted on rollers by operating the lift system in a similar manner as the hauling beams. A forklift is connected to the move platform through the forklift adapter 1008 and the forklift 1002 is used to push the hauling transporter to the vehicle (or other location where the load is placed). When the move platform is in place, it is lowered on the surface underneath (herein loading dock) or alternatively to a desired set height, the forklift may be disconnected from the ramp 1005. Now the forklift is driven up the ramp 1005 and the forks of the forklift are pushed on the sockets 1006. The hauling beams are operated to lift the load and the hauling beams on the rollers 305 of the hauling beams. The hauling beams are pushed to the vehicle by the forklift. Sometimes the loading bed of the vehicle is not level with the loading dock. In such case the modular construction of the hauling beams allow the modules to accommodate to the varying surface and the load is securely supported without overstressing the hauling beams. The lifting mechanism 303 of the rollers 305 is equipped with a spring system that holds the rollers up and the slip ring 312 against the angled part of the inner beam and prevent dropping of the roller in the gap between the bed of the vehicle and he loading dock or similar void. The spring system may be a draw spring 1201 depicted in FIGS. 12 and 13 or other spring element, for example a torsion spring or a spring or other element made of elastic material. The move platform may have tracks 1102 or rails for guiding the hauling beams. It is possible to equip the move platform or the hauling transporter with an actuator for moving the hauling beams along the move platform. However, forklifts and similar goods handling apparatuses are usually readily available at loading places, whereby extra cost of such actuator system may not be reasonable. The mechanism for lifting the move platform may be used for adjusting the level of the platform. In such case the mechanism may be equipped with studs or legs instead of rollers.

The construction of connectors and couplers used may vary. However, they must be able to transfer pushing and drawing forces and allow at least angular displacement of successive beams they connect.

FIGS. 15 and 16 depict a third hauling beam module. This is an end module 1501 that can be used if the height of the end or tip of the hauling beam has to be minimized. The lifting mechanism 303 is similar to the mechanism described above. The modification herein is that the height of the hauling beam module decreases towards the end of the third hauling beam module from the connection end of the modules. The side profile of the outer beam is triangular, more exactly a cut triangle. As can be seen from FIG. 16, this third hauling beam module 1501 is tilted downwards from the second hauling beam module 502 when set on a surface 1001. When the third hauling beam module is lifted, the mechanism is dimensioned to elevate the surface of the third hauling beam module on the same level as the rest of the loading surface of the hauling beam. This may be accomplished by dimensioning of the angled surface to provide the lift needed or by adjusting the lengths of the support arms 309.

The number of the hauling beams and hauling beam modules can be changed according to the capacity and dimensions needed to handle the particular loads.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention can be used for transport and loading of goods.

The invention claimed is:

1. A hauling beam comprising at least two hauling beam modules, the modules comprising two nested beams, an outer beam and an inner beam, said nested beams configured to be movable longitudinally with respect to each other, a support arm movably attached to the outer beam, a slip ring and a roller coaxially attached to the support arm, the inner beam having a section extending at an angle to the length of the side edge of the inner beam so that the slip ring is arranged so that when the nested beams move relative to each other in the longitudinal direction of the beams, the roller is arranged to move in the vertical direction of the beams, wherein
 a first hauling beam module comprises an actuator for moving the inner beam in relation to the outer beam,
 said inner beam of the first hauling beam module is connected to an inner beam of the second hauling beam module by a connector configured to transfer both forwards and backwards longitudinal movement of said inner beam of said first hauling module to the inner beam of said second hauling module and to allow tilting of the connector in relation to the longitudinal direction of said inner beams, and
 said outer beam of the first beam module is connected to an outer beam of the second hauling beam module by a coupler configured to transfer both forwards and backwards longitudinal movement of said outer beam of said first hauling module to the outer beam of said second hauling module and to allow tilting of the coupler in relation to the longitudinal direction of said outer beams.

2. The hauling beam according to claim 1, wherein the inner beams of the first and second hauling beam modules are connected with each other independently from the outer beams.

3. The hauling beam according to claim 1, further comprising a hauling beam module having an outer beam comprising a triangular side profile so that the outer beam of the module is higher at the end connected to another module than at the opposite end.

4. The hauling beam according to claim 1, further comprising a connector for connecting the inner beams of the first and second hauling beam modules, the connector comprising a connecting piece and a locking bracket at each end of the connecting piece and locking axles on the locking brackets for connecting to the inner beams.

5. The hauling beam according to claim 4, wherein an upper surface of the outer beam has assembly holes for locking pins of the locking brackets at least in one of the hauling beam modules.

6. The hauling beam according to claim 4, wherein the locking brackets are profiled tubes.

7. The hauling beam according to claim 1, wherein the coupler for connecting the outer beams is coupling plate having a hole at each end and plate locking bolts for attachment to the outer beam.

8. The hauling beam according to claim 1, further comprising a spring for retaining the slip ring against the section of the inner beam extending at an angle to the length of the side edge of the inner beam.

9. The hauling beam according to claim 1, further comprising at least three hauling beam modules.

10. The hauling beam according to claim 7, further comprising at least three different hauling beam modules.

11. A hauling beam transporter, comprising at least two hauling beams comprising at least two hauling beam modules, the hauling beam modules comprising two nested beams, an outer beam and an inner beam, configured to be movable longitudinally with respect to each other, a support arm movably attached to the outer beam, a slip ring and a roller coaxially attached to the support arm, the inner beam having a section extending at an angle to the length of the side edge of the inner beam so that the slip ring is arranged so that when the nested beams move relative to each other in the longitudinal direction of the beams, the roller is arranged to move in the vertical direction of the beams, wherein
 a first hauling beam module comprises an actuator for moving the inner beam in relation to the outer beam,
 said inner beam of the first beam module is connected to an inner beam of the second hauling beam module by a connector configured to transfer both forwards and backwards longitudinal movement of said inner beam of said first hauling module to the inner beam of said second hauling module and to allow tilting of the connector in relation to the longitudinal direction of said inner beams,
 said outer beam of the first beam module is connected to an outer beam of the second hauling beam module by a coupler configured to transfer both forwards and backwards longitudinal movement of said outer beam of said first hauling module to the outer beam of said second hauling module and to allow tilting of the coupler in relation to the longitudinal direction of said outer beams, and
 the hauling beams are mounted on a move platform.

12. The hauling beam transporter according to claim 11, wherein the hauling beams are set parallel and configured to move longitudinally in synchrony.

13. A method for transferring a load, comprising:
 collecting a load and placing it on a hauling transporter,
 lifting a move platform of the hauling transported on rollers by operating a lift system,
 pushing the hauling transporter to a loading location,
 lowering the move platform on a surface,
 lifting the load from the move platform by hauling beams, and
 pushing the load on the hauling beams to a second loading location.

14. The method according to claim 13, further comprising:
 connecting a forklift to the move platform through a forklift adapter, pushing the hauling transporter to the loading location by the forklift,
lowering the move platform, when the move platform is in place, on a surface underneath or alternatively to a desired set height,
disconnecting the forklift from a ramp,
driving the forklift up the ramp,
pushing forks of the forklift on sockets of the hauling beams, and
pushing the hauling beams to the second loading location by the forklift.

\* \* \* \* \*